US005754704A

United States Patent [19]

Barnsley et al.

[11] Patent Number: 5,754,704

[45] Date of Patent: May 19, 1998

[54] METHOD AND APPARATUS FOR COMPRESSING AND DECOMPRESSING THREE-DIMENSIONAL DIGITAL DATA USING FRACTAL TRANSFORM

[75] Inventors: Michael F. Barnsley, Duluth; Lyman P. Hurd, Dunwoody; Stephen Demko, Atlanta, all of Ga.

[73] Assignee: Interated Systems, Inc., Norcross, Ga.

[21] Appl. No.: 401,672

[22] Filed: Mar. 10, 1995

[51] Int. Cl.[6] .................. G06K 9/36; G06K 9/46

[52] U.S. Cl. .................. 382/249; 382/232; 358/433

[58] Field of Search .................. 382/249, 154, 382/233, 232; 358/432, 433

[56] References Cited

U.S. PATENT DOCUMENTS

| | | | |
|---|---|---|---|
| 3,215,773 | 11/1965 | Chatten et al. | 382/100 |
| 4,442,454 | 4/1984 | Powell | 348/618 |
| 4,694,407 | 9/1987 | Ogden | 382/278 |
| 4,805,225 | 2/1989 | Clark | 382/161 |
| 4,941,193 | 7/1990 | Barnsley et al. | 382/249 |
| 5,065,447 | 11/1991 | Barnsley et al. | 382/249 |
| 5,274,466 | 12/1993 | Ida et al. | 382/249 |
| 5,384,867 | 1/1995 | Barnsley et al. | 382/249 |

FOREIGN PATENT DOCUMENTS 0220706 5/1987 European Pat. Off. .

OTHER PUBLICATIONS

Kiselyov et al., "Self-Similarity of the Multiresolution Image/Video Decomposition: Smart Expansion as Compression of Still and Moving Pictures," Data Compression, 1994 Conference, pp. 331–340.

Lazar et al., "Fractal Block Coding of Digital Video," IEEE Transactions on Circuits and Systems for Video Technology, pp. 297–308, Jun. 1994.

Naemura et al., "Fractal Coding of a Multi-View 3-D Image," Image Processing, 1994 International Conference, pp. 107–111.

Paul et al. "Fractal-Based Compression of Motion Video Sequences," Image Processing, 1994 International Conference, pp. 755–759.

Iterated Function Systems and The Global Construction of Fractals, Proc. R. Soc. Lond., A399, 243–275 (1985).

Solution of an Inverse Problem for Fractals and Other Sets, Proc. Natl. Acad. Sci. USA, vol. 83, 1975–1977 (Apr. 1986).

A New Class of Markov Processes for Image Encoding, School of Mathematics, Georgia Inst. of Technology (1988).

Fractal Modelling of Biological Structures, Perspectives in Biological Dynamics and Theoretical Medicine, Koslow, Mandell, Shlesinger, eds., Annals of New York Academy of Sciences, vol. 504, 179–194.

An Ergodic Theorem for Iterated Maps, Ergodic Theory and Dynamical Systems, 7 (1987).

Construction of Fractal Objects with Iterated Function Systems, Siggraph '85 Proceedings, vol. 19, No. 3, 271–278 (1985).

Fractal Modelling of Real World Images, Lecture Notes for Fractals: Introduction, Basics and Perspectives, Siggraph (1987).

Packing It In—Fractals . . . , Science News, vol. 131, No. 18, pp. 283–285, May 2, 1987.

(List continued on next page.)

*Primary Examiner*—Leo Boudreau
*Assistant Examiner*—Bhavesh Mehta
*Attorney, Agent, or Firm*—Finnegan, Henderson, Farabow, Garrett & Dunner, L.L.P.

[57] ABSTRACT

A method and apparatus are described for-encoding a three-dimensional array of data representing a physical entity, such as an image (or sequence of frames), by means of its local symmetries. This encoding yields both compression and a resolution-independent description which allows reconstruction of the image to an arbitrary scale. Spatial zooming and interframe interpolation can be achieved without significant loss of information.

13 Claims, 14 Drawing Sheets

OTHER PUBLICATIONS

Fractal Geometry—Understanding Chaos, Georgia Tech Alumni Magazine, p. 16 (Spring 1986).
Fractals—A Geometry of Nature, Georgia Institute of Technology Research Horizons, p. 9 (Spring 1986).
A Better Way to Compress Images, by Barnsley et al., Byte Magazine, Jan. 1988.
Researchers Use Fractal Geometry . . . , by Skip Derra, Research and Development Magazine, Mar. 1988.
Data Compression: Pntng by Numbrs The Economist, May 21, 1988.
Just the Bare Facts, Please, by William Baldwin, Forbes Magazine, Dec. 12, 1988.
Harnessing Chaos For Images Systhesis, by Barnsley et al., Computer Graphics, vol. 22, No. 4, Aug. 1988.
Chaotic Compression, by Barnsley et al., Computer Graphics World, Nov. 1987.
Making A New Science, pp. 215, 239, by James Gleick.

Hidden Variable Fractal Interpolation Functions, by Barnsley et al., School of Mathematics, Georgia Institute of Technology, Atlanta, GA 30332.

A Fractal Based Approach To Image Compression, Proc. ICASSP 86, vol. 1 pp. 529–532, Tokyo, Apr. 1986.

"Ideas Galore, But Where Are The Goods?", Business Week, Feb. 10, 1992, pp. 122–123.

IEEE Transactions on Communications, vol. com–31, No. 4, Apr. 1983, IEEE (New York, US), P.J. Burt et al.: "The laplacian pyramid as a compact image code", pp. 532–540, see page 532, abstract.

Fractal (Self–VQ) Encoding of Video Sequences, Proceedings, vol. 2308 Sep. 1994.

| MEMORY ADDRESS | VALUE (X, Y, Z) |
|---|---|
| 0000 | $V_{000}$ |
| 0001 | $V_{100}$ |
| 0002 | $V_{200}$ |
| 0003 | $V_{300}$ |
| 0004 | $V_{010}$ |
| 0005 | $V_{110}$ |
| 0006 | $V_{210}$ |
| 0007 | $V_{310}$ |
| 0008 | $V_{020}$ |
| 0009 | $V_{120}$ |
| 000A | $V_{220}$ |
| 000B | $V_{320}$ |
| 000C | $V_{030}$ |
| 000D | $V_{130}$ |
| 000E | $V_{230}$ |
| 000F | $V_{330}$ |

*FIG. 8*

ITERATION #0 (INITIAL ARBITRARY VALUES)

0

| FRAME 0 | | | | FRAME 1 | | | | FRAME 2 | | | | FRAME 3 | | | |
|---|---|---|---|---|---|---|---|---|---|---|---|---|---|---|---|
| (128) | 128 | (128) | 128 | 128 | 128 | 128 | 128 | (128) | 128 | (128) | 128 | 128 | 128 | 128 | 128 |
| 128 | 128 | 128 | 128 | 128 | 128 | 128 | 128 | 128 | 128 | 128 | 128 | 128 | 128 | 128 | 128 |
| (128) | 128 | (128) | 128 | 128 | 128 | 128 | 128 | (128) | 128 | (128) | 128 | 128 | 128 | 128 | 128 |
| 128 | 128 | 128 | 128 | 128 | 128 | 128 | 128 | 128 | 128 | 128 | 128 | 128 | 128 | 128 | 128 |

(Axes: X →, Y ↓, Z →)

RANGE: BLOCK

| FRAME A | | FRAME B | |
|---|---|---|---|
| 128 | 128 | 128 | 128 |
| 128 | 128 | 128 | 128 |

| FRAME 0 | | | | FRAME 1 | | | | FRAME 2 | | | | FRAME 3 | | | |
|---|---|---|---|---|---|---|---|---|---|---|---|---|---|---|---|
| (64) | 64 | (96) | 96 | 64 | 64 | 96 | 96 | (96) | 96 | (128) | 128 | 96 | 96 | 128 | 128 |
| 64 | 64 | 96 | 96 | 64 | 64 | 96 | 96 | 96 | 96 | 128 | 128 | 96 | 96 | 128 | 128 |
| (96) | 96 | (128) | 128 | 96 | 96 | 128 | 128 | (128) | 128 | (160) | 160 | 128 | 128 | 160 | 160 |
| 96 | 96 | 128 | 128 | 96 | 96 | 128 | 128 | 128 | 128 | 160 | 160 | 128 | 128 | 160 | 160 |

| FRAME A | | FRAME B | |
|---|---|---|---|
| 64 | 96 | 96 | 128 |
| 96 | 128 | 128 | 160 |

| FRAME 0 | FRAME 1 | FRAME 2 | FRAME 3 |
|---|---|---|---|
| (32) 48 (64) 80 | 48 64 80 96 | (64) 80 (96) 112 | 80 96 112 128 |
| 48 64 80 96 | 64 80 96 112 | 80 96 112 128 | 96 112 128 144 |
| (64) 80 (96) 112 | 80 96 112 128 | (96) 112 (128) 144 | 112 128 144 160 |
| 80 96 112 128 | 96 112 128 124 | 112 128 144 160 | 128 144 160 176 |

| FRAME A | FRAME B |
|---|---|
| 32 64 | 64 96 |
| 64 96 | 96 128 |

| FRAME 0 | FRAME 1 | FRAME 2 | FRAME 3 |
|---|---|---|---|
| (16) 32 (48) 64 | 32 48 64 80 | (48) 64 (80) 96 | 64 80 96 112 |
| 32 48 64 80 | 48 64 80 96 | 64 80 96 112 | 80 96 112 128 |
| (48) 64 (80) 96 | 94 80 96 112 | (80) 96 (112) 128 | 96 112 128 144 |
| 64 80 96 112 | 80 96 112 128 | 96 112 128 144 | 112 128 144 160 |

| FRAME A | FRAME B |
|---|---|
| 16 48 | 48 80 |
| 48 80 | 80 112 |

4

| FRAME 0 | | | | FRAME 1 | | | | FRAME 2 | | | | FRAME 3 | | | |
|---|---|---|---|---|---|---|---|---|---|---|---|---|---|---|---|
| 8 | 24 | 40 | 56 | 24 | 40 | 56 | 72 | 40 | 56 | 72 | 88 | 56 | 72 | 88 | 104 |
| 24 | 40 | 56 | 72 | 40 | 56 | 72 | 88 | 56 | 72 | 88 | 104 | 72 | 88 | 104 | 120 |
| 40 | 56 | 72 | 88 | 56 | 72 | 88 | 104 | 72 | 88 | 104 | 120 | 88 | 104 | 120 | 136 |
| 56 | 72 | 88 | 104 | 72 | 88 | 104 | 120 | 88 | 104 | 120 | 136 | 104 | 120 | 136 | 152 |

| FRAME A | | FRAME B | |
|---|---|---|---|
| 8 | 40 | 70 | 72 |
| 40 | 72 | 72 | 104 |

| FRAME 0 | | | | FRAME 1 | | | | FRAME 2 | | | | FRAME 3 | | | |
|---|---|---|---|---|---|---|---|---|---|---|---|---|---|---|---|
| 4 | 20 | 63 | 52 | 20 | 36 | 52 | 68 | 36 | 52 | 68 | 84 | 52 | 68 | 84 | 100 |
| 20 | 36 | 52 | 68 | 36 | 52 | 68 | 84 | 52 | 68 | 84 | 100 | 68 | 84 | 100 | 116 |
| 36 | 52 | 68 | 84 | 52 | 68 | 84 | 100 | 68 | 84 | 100 | 116 | 84 | 100 | 116 | 132 |
| 52 | 68 | 84 | 100 | 68 | 84 | 100 | 116 | 84 | 100 | 116 | 132 | 100 | 116 | 132 | 148 |

| FRAME A | | FRAME B | |
|---|---|---|---|
| 4 | 36 | 36 | 68 |
| 36 | 68 | 68 | 100 |

| FRAME 0 | | | | FRAME 1 | | | | FRAME 2 | | | | FRAME 3 | | | |
|---|---|---|---|---|---|---|---|---|---|---|---|---|---|---|---|
| (2) | 18 | (34) | 56 | 18 | 34 | 50 | 66 | (34) | 50 | (66) | 82 | 50 | 66 | 82 | 98 |
| 18 | 34 | 50 | 66 | 34 | 50 | 66 | 82 | 50 | 66 | 82 | 98 | 66 | 82 | 98 | 114 |
| (34) | 50 | (66) | 82 | 50 | 66 | 82 | 98 | (66) | 82 | (98) | 114 | 82 | 98 | 114 | 130 |
| 50 | 66 | 82 | 98 | 66 | 82 | 98 | 114 | 82 | 98 | 114 | 130 | 98 | 114 | 130 | 146 |

| FRAME A | | FRAME B | |
|---|---|---|---|
| 2 | 34 | 34 | 66 |
| 34 | 66 | 66 | 98 |

| FRAME 0 | | | | FRAME 1 | | | | FRAME 2 | | | | FRAME 3 | | | |
|---|---|---|---|---|---|---|---|---|---|---|---|---|---|---|---|
| (1) | 17 | (33) | 49 | 17 | 33 | 49 | 65 | (33) | 49 | (65) | 81 | 49 | 65 | 81 | 97 |
| 17 | 33 | 49 | 65 | 33 | 49 | 65 | 81 | 49 | 65 | 81 | 97 | 65 | 81 | 97 | 113 |
| (33) | 49 | (65) | 81 | 49 | 65 | 81 | 97 | (65) | 81 | (97) | 113 | 81 | 97 | 113 | 129 |
| 49 | 65 | 81 | 97 | 65 | 81 | 97 | 113 | 81 | 97 | 113 | 129 | 97 | 113 | 129 | 145 |

| FRAME A | | FRAME B | |
|---|---|---|---|
| 1 | 33 | 33 | 65 |
| 33 | 65 | 65 | 97 |

| FRAME 0 | | | | FRAME 1 | | | | FRAME 2 | | | | FRAME 3 | | | |
|---|---|---|---|---|---|---|---|---|---|---|---|---|---|---|---|
| 0 | 16 | 32 | 48 | 16 | 32 | 48 | 64 | 32 | 48 | 64 | 80 | 48 | 64 | 80 | 96 |
| 16 | 32 | 48 | 64 | 32 | 48 | 64 | 80 | 48 | 64 | 80 | 96 | 64 | 80 | 96 | 112 |
| 32 | 48 | 64 | 80 | 48 | 64 | 80 | 96 | 64 | 80 | 96 | 112 | 80 | 96 | 112 | 128 |
| 48 | 64 | 80 | 96 | 64 | 80 | 96 | 112 | 80 | 96 | 112 | 128 | 96 | 112 | 128 | 144 |

| FRAME A | | FRAME B | |
|---|---|---|---|
| 0 | 32 | 32 | 64 |
| 32 | 64 | 64 | 96 |

| FRAME 0 | | | | FRAME 1 | | | | FRAME 2 | | | | FRAME 3 | | | |
|---|---|---|---|---|---|---|---|---|---|---|---|---|---|---|---|
| 0 | 16 | 32 | 48 | 16 | 32 | 48 | 64 | 32 | 48 | 64 | 80 | 48 | 64 | 80 | 96 |
| 16 | 32 | 48 | 64 | 32 | 48 | 64 | 80 | 48 | 64 | 80 | 96 | 64 | 80 | 96 | 112 |
| 32 | 48 | 64 | 80 | 48 | 64 | 80 | 96 | 64 | 80 | 96 | 112 | 80 | 96 | 112 | 128 |
| 48 | 64 | 80 | 96 | 64 | 80 | 96 | 112 | 80 | 96 | 112 | 128 | 96 | 112 | 128 | 144 |

| FRAME A | | FRAME B | |
|---|---|---|---|
| 0 | 32 | 32 | 64 |
| 32 | 64 | 64 | 96 |

*FIG. 9J*

METHOD AND APPARATUS FOR COMPRESSING AND DECOMPRESSING THREE-DIMENSIONAL DIGITAL DATA USING FRACTAL TRANSFORM

BACKGROUND OF THE INVENTION

The present invention relates generally to the transformation of digital data representing physical entities which can be represented in three dimensions. In particular, it relates to the use of contractive transformations for representing three-dimensional or video images.

Methods and techniques for encoding two-dimensional digital data and an alternate scheme for video encoding are described in U.S. Pat. No. 5,347,600 entitled IMPROVED METHOD AND APPARATUS FOR COMPRESSION AND DECOMPRESSION OF DIGITAL IMAGE DATA, issued Sep. 13, 1994 to Michael F. Barnsley and Alan D. Sloan. The disclosure of this patent is hereby expressly incorporated by reference.

Compression of digital data representing images is a vital area of research. A set of digital data representing a single image often requires far more storage than the proverbial thousand words it replaces. The problems associated with the compression of still images, however, pale beside the problems posed by moving pictures or medical images in which many cross sectional slices form a three-dimensional image. If such images are displayed at standard video rates, even low resolution images quickly use up available bandwidth and storage resources.

Traditionally, image compression methods may be classified as those which reproduce the original data exactly, that is, "lossless compression" and those which trade a tolerable divergence from the original for greater compression, that is, "lossy compression." Lossless methods have the problem that they are unable to achieve compression in typical data of much more than 70%. Therefore in these applications, lossy methods are essential.

The method and apparatus for data compression disclosed relate to a lossy method which has the following features:

- dramatic compression ratios
- spatial resolution independence, in that for data representing an image, the image can be displayed on monitors of any desired resolution or aspect ratio.
- temporal resolution independence—the data can be displayed at any desired rate (or, equivalently for image data, any number of slices)

Another feature of the invention is that the disclosed method and apparatus have the ability to reconstruct portions of a compressed image without having to decompress the entire image. This makes the technique particularly suitable for video memory or the storage of large visual databases.

Another aspect of this invention provides a method for encoding a series of frames of image data with a definite temporal ordering and indefinite temporal extent, such as video images, which relies on previous frames, in which the storage savings of differential encoding are gained without sacrificing random access.

SUMMARY OF THE INVENTION

In accordance with the purpose of the invention, there is provided a method for automatically compressing digital data representative of a physical entity, comprising steps performed by a data processor. These steps include storing the digital data in a three-dimensional data set of predetermined size in the data processor and generating a set of uniquely addressable three-dimensional domain boxes from the stored digital data, each of the domain boxes representing a different portion of the stored digital data such that all of the domain boxes together contain all of the stored digital data. The method further includes the steps of creating, from the stored digital data, a set of uniquely addressable three-dimensional mapped range boxes each corresponding to one of a plurality of three-dimensional subsets of the digital data, with each of the subsets having a unique address, the creating step for each mapped range box including the substep of shrinking the one of the subsets of the digital data which corresponds to the mapped range box such that there is a one-to-one correspondence between values of the domain boxes and values of the mapped range boxes; and assigning unique box identifiers to corresponding ones of the mapped range boxes, each of the box identifiers specifying for the corresponding mapped range box an address of the corresponding subset of digital data. The method also includes the steps of performing a first affine transformation on a first set of boxes of the stored digital data comprising one of the domain box set and the mapped range box set, wherein a second set of boxes of the stored digital data comprises the other of the domain box set and the mapped range box set, and wherein the first affine transformation applied to each of the boxes of the first set has a corresponding transformation identifier and forming, for each of the domain boxes, a selected pair of boxes, each box pair including one box from each of the first and second box sets, one of the boxes of each pair being the box of its corresponding set which most closely corresponds to the other box of the pair according to predetermined criteria. Finally, the method includes the step of supplying a set of codewords each comprising an identifier pair as a compressed representation of the digital data in a data set of a size smaller than the predetermined size, each identifier pair corresponding to a different one of the formed selected box pairs, each of the identifier pairs comprising a box identifier associated with one of the boxes of the corresponding box pair and a transformation identifier associated with one of the boxes of the corresponding box pair.

In another aspect of the invention, there is provided apparatus for automatically compressing digital data representative of a physical entity existing in three dimensions. The apparatus comprises an input device for supplying digital data, a memory for storing the digital data in a three-dimensional data set of predetermined size in the data processor, and a data processor for generating a set of uniquely addressable three-dimensional domain boxes from the stored digital data. Each of the domain boxes represents a different portion of the stored digital data such that all of the domain boxes together contain all of the stored digital data. The data processor creates, from the stored digital data, a set of uniquely addressable three-dimensional mapped range boxes each corresponding to one of a plurality of three-dimensional subsets of the digital data, with each of the subsets having a unique address such that each mapped range box comprises a shrunken version of the one of the subsets of the digital data which corresponds to the mapped range box such that there is a one-to-one correspondence between values of the domain boxes and values of the mapped range boxes. The data processor also assigns unique box identifiers to corresponding ones of the mapped range boxes, with each of the box identifiers specifying for the corresponding mapped range box an address of the corresponding subset of digital data. The data processor performs a first affine transformation on a first set of boxes of the stored digital data comprising one of the domain box set and the mapped range box set, wherein a second set of boxes of the stored digital data comprises the other of the domain box set and the mapped range box set, and wherein the first affine transformation applied to each of the boxes of the first set has a corresponding transformation identifier. The apparatus further comprises a comparator for comparing boxes of the first and second sets and for selecting, for each of the domain boxes, a selected pair of boxes, each box pair including one box from each of the first and second box sets, one of the boxes of each pair being the box of its corresponding set which most closely corresponds to the other box of the pair according to predetermined criteria. The apparatus also comprises an output device for supplying a set of codewords each comprising an identifier pair as a compressed representation of the digital data in a data set of a size smaller than the predetermined size, each identifier pair corresponding to a different one of the formed selected box pairs, each of the identifier pairs comprising a box identifier associated with one of the boxes of the corresponding box pair and a transformation identifier associated with one of the boxes of the corresponding box pair.

BRIEF DESCRIPTION OF THE DRAWINGS

FIG. 8 is a diagram showing an array of computer memory;

FIG. 9 is a chart showing contents of a computer memory array including 64 values and a range block;

DESCRIPTION OF THE PREFERRED EMBODIMENT

Introduction

Digital data representing a physical entity is often expressed as a two-dimensional array. For example, a digital image is considered to consist of a two-dimensional array $x_{i,j}$ of pixels each having a value equal to one of a finite set of values. Video images are considered to consist of a sequence of such arrays, known as "frames." Many compression schemes take advantage of similarities between adjacent frames by computing the difference between successive frames, but few methods take advantage of longer range correlations, that is, similarities between non-adjacent frames.

Figure 1:
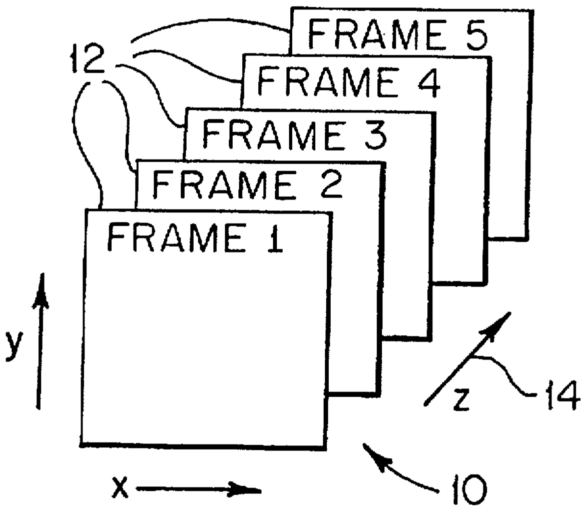
FIG. 1 shows a three dimensional array of pixels arranged as a sequence of frames.

As shown in FIG. 1, the present invention relates to a three-dimensional array 10 of data, such as pixels, $x_{i,j,k}$ arranged as a sequence of slices or frames 12. Time is given a symmetric role with the spatial variables. For example, in FIG. 1, the z axis 14 can represent time, as measured in frames. This symmetry allows the present invention to be applied without modification to data which is not time-dependent, but which requires three spatial dimensions to describe, such as CT scans. In this application, the third variable will be described as time but the techniques will be understood to apply to static three-dimensional data as well. Moreover, it is to be understood that the invention is not limited to image data but may be applied to any type of digital data representative of a physical entity which can be represented in three dimensions.

Compression of video data can be performed using the two-dimensional fractal transform described in the aforementioned U.S. Pat. No. 5,347,600. However, the treatment of video images in that patent differs from the present invention in several important ways:

1. In the prior art two-dimensional fractal transform, data in frame n of the image is encoded in terms of frame n−1; in the present invention, data in frame n can be encoded in terms of frames taken from anywhere in the image.
2. The local transformation in the video implementation of the prior art two-dimensional fractal transform is contractive spatially, but not in the time direction. This means that the horizontal and vertical dimension can be compressed but not the time dimension. The three-dimensional fractal transform is contractive in all directions.
3. The prior art two-dimensional fractal transform provides a method of resealing or, in effect, interpolating the spatial dimensions of an image, but not the temporal dimension or frame rate. In the present invention the height, width, and number of slices in the image are independently scalable.

A three-dimensional data array, such as a video image, can be divided into a group of subsets called domain sets, with the property that each member of the array (that is, each pixel in the image) is contained in one of these sets. The domain sets thus collectively contain all data of the array. To provide data compression, each of the domain sets can be represented by a "codeword." A codeword comprises an identifier of a corresponding "range set" and an identifier of a transformation from range set to domain set. The range set need not be one of the predetermined domain sets, and can overlap other range sets.

Taken together, the codewords describe a transformation, T, on three-dimensional images with the following properties:

When T is applied to the original image, the result is nearly the same as the original.

If T is applied repeatedly to an arbitrary initial image having the same dimensions as the original, the resulting image will be very close to the original (encoded) image, independent of the contents of the initial image.

The transformation T is not tied to a particular choice of image dimensions. If T is applied repeatedly to an initial arbitrary image of different size and/or proportions from the encoded original image, the result will be a fractally rescaled version of the encoded image.

This approach has two advantages. First, the codeword is usually represented in many fewer bits than a pixel-by-pixel description of the domain set. Second, since the codewords are a representation of an ideal mathematical image, the codewords provide a resolution-independent description of the original image.

DETAILED DESCRIPTION

Figure 2:
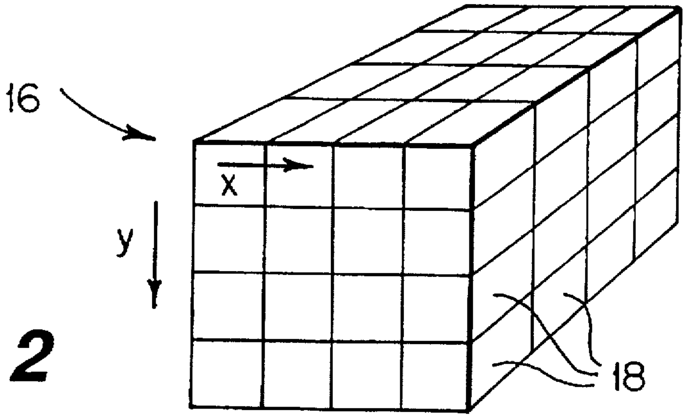
FIG. 2 shows a three dimensional data array representing the pixel array of FIG. 1.

In the preferred embodiment, the three-dimensional pixel array 10 is represented by a data array 16 partitioned into rectangular domain boxes 18, as shown in FIG. 2. As noted above, the data array 16 may represent a series of images or any other type of physical entity, such as audio information, seismic data, etc.

Figure 3:
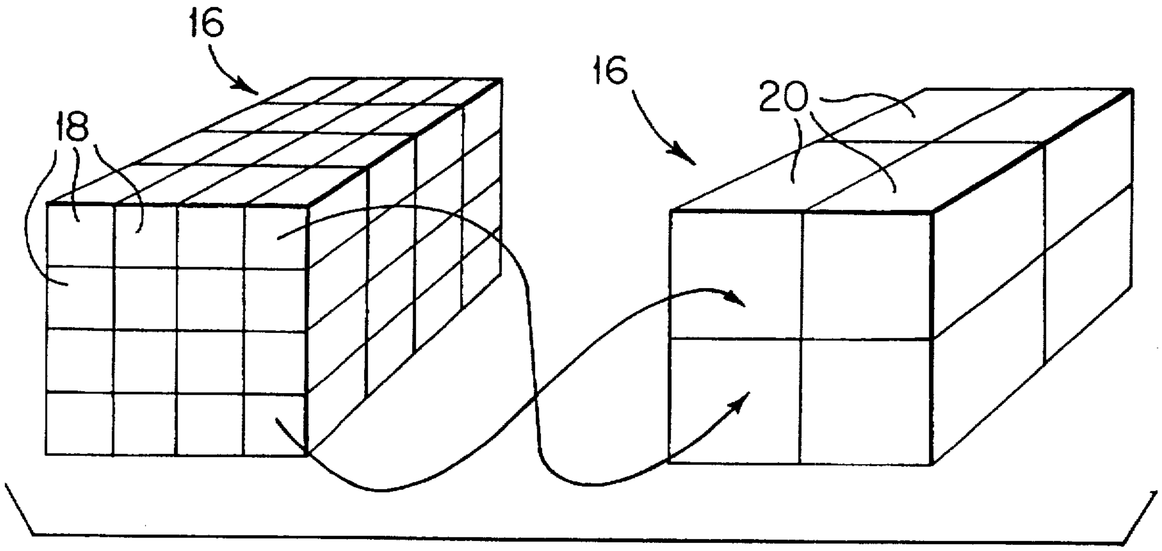
FIG. 3 shows the array of FIG. 2 partitioned into domain boxes and range boxes.

Correspondence between domain boxes 18 and larger groups of array 16, known as "range boxes" 20, is illustrated in FIG. 3.

To each domain box is assigned a codeword comprising the following components:

1. Range box address
2. Reduction operator
3. Symmetry operator
4. Pixel operator Each of the components of a codeword is described below, followed by a description of the method by which a codeword is chosen for a given domain box. Any of these components may be understood to be held constant over the entire image, or over a large number of domain boxes, in which case they need not be represented explicitly in a file consisting of the set of all codewords representing the original data array.

The data to be encoded consists of an array $X_{i,j,k}$ for values of i, j, and k from 0, . . . , n−1, such as array 16. It is often the case that $n=2^b$ for some positive integer b, with b referred to as the "bits per pixel" or "image depth". This usage is not to be confused with the depth of a three-dimensional image represented by the z coordinate.

The array has definite bounds in each dimension, that is, i,j,k satisfy the inequalities, $0 \leq i<w$, $0 \leq j<h$ and $0 \leq k<d$. A box thus consists of a definite subset of the original image data array given by the set of pixels satisfying possible more restrictive bounds. A box is completely described by an offset address $(b_x,b_y,b_z)$ and extent $(b_w,b_h,b_d)$, and such a description will be taken to mean all pixels $x_{i,j,k}$ where $b_x \leq i \leq b_x+b_w$, $b_y \leq j<b_y+b_h$ and $b_z \leq k<b_z+b_d$.

The range box 20 corresponding to a given domain box 18 will have the same spatial proportions, but will have dimensions which may in general be larger by a proportionality constant.

Reduction Operator

The first step in obtaining a reduction operator is to perform an operation on each range box which yields a reduced, or "shrunken", range box whose pixels can be put in one-to-one correspondence with the domain box. Since the range box is usually larger than its corresponding domain box, the reduction consists of obtaining from each subset of the range box a single representative value (for example, if the range box has twice the spatial dimensions of the domain box, the reduction operator consists of finding a single value representing a 2×2×2 sub-box of the range box). This operation can be thought of as "shrinking" the range box. Typical methods include:

1. choosing a single representative of the sub-box (for example, the pixel with minimal x,y,z coordinates).
2. choosing the mean value of the pixels in the sub-box (rounded to a legal pixel value).
3. choosing the most common value in the sub-box (mode).
4. choosing the median pixel value in the sub-box.

When the range box is twice as big as the domain box, method (1) yields the formula:

$$r'(i,j,k)=r(2i,2j,2k) \tag{1}$$

and method (2) yields the formula:

$$r'(i,j,k) = trunc\left( (1/8) \sum_{\delta_x=0}^{1} \sum_{\delta_y=0}^{1} \sum_{\delta_x=0}^{1} r(i+\delta_x, j+\delta_y, k+\delta_k) \right)$$

The truncation operator in the above equation consists of rounding the answer to a legal pixel value.

Symmetry Operator

After reduction, the range box undergoes a symmetry operation, that is, the pixel values are transformed according to a geometric symmetry of the underlying box. For example, a cube has forty-eight rigid symmetries comprising twenty-four rotations and twenty-four reflections. The rotations are obtained by choosing each of the six faces, in turn, to be the bottom face, and orienting this face in each of four directions (hence 24=6×4). An additional twenty-four reflections are obtained by performing one of the aforementioned rotations, followed by a reflection in a plane passing through the middle of the cube parallel to one of the faces.

If the sides of the box are not all the same length, the box has correspondingly fewer symmetries. In case two sides are equal and the third is not, there are sixteen symmetries (eight planar symmetries of the square face times two possible reflections with respect to a plane cutting through the middle of the box parallel to the square faces). If all three dimensions are unequal, then there are eight symmetries corresponding to possible combinations of reflections in planes parallel to each of the coordinate axes.

The possible symmetries for a rectangular box with dimensions $r_w,r_h,r_d$ are summarized in Tables 1 and 2. Different choices for the shape of the domain set will yield a corresponding, finite, table of this form readily obtained by methods well-known in the art.

TABLE 1

Symmetries (0–23).

| Symmetry | (i,j,k) → | Conditions |
|---|---|---|
| 0 | (i,j,k) | |
| 1 | $((r_w-1)-i,j,k)$ | |
| 2 | $(i,(r_h-1)-j,k)$ | |
| 3 | $((r_w-1)-i,(r_h-1)-j,k)$ | |
| 4 | $(i,j,(r_d-1)-k)$ | |
| 5 | $((r_w-1)-i,j(r_d-1)-k)$ | |
| 6 | $(i,(r_h-1)-j,(r_d-1)-k)$ | |
| 7 | $((r_w-1)-i,(r_h-1)-j,(r_d-1)-k)$ | |
| 8 | (j,i,k) | $r_w = r_h$ |
| 9 | $((r_w-1)-j,i,k)$ | |
| 10 | $(j,(r_h-1)-i,k)$ | |

TABLE 1-continued

Symmetries (0–23).

| Symmetry | (i,j,k) → | Conditions |
|---|---|---|
| 11 | $((r_w - 1) - j,(r_h - 1) - i,k)$ | |
| 12 | $(j,i,(r_d - 1) - k)$ | |
| 13 | $((r_w - 1) - j,i,(r_d - 1) - k)$ | |
| 14 | $(j,(r_h - 1) - i,(r_d - 1) - k)$ | |
| 15 | $((r_w - 1) - j,(r_h - 1) - i,(r_d - 1) - k)$ | |
| 16 | $(k,j,i)$ | $r_w = r_d$ |
| 17 | $((r_w - 1) - k,j,i)$ | |
| 18 | $(k,(r_h - 1) - i,k)$ | |
| 19 | $((r_w - 1) - k,(r_h - 1) - j,i)$ | |
| 20 | $(k,j,(r_d - 1) - i)$ | |
| 21 | $((r_w - 1) - k,j,(r_d - 1) - i)$ | |
| 22 | $(k,(r_h - 1) - j,(r_d - 1) - i)$ | |
| 23 | $((r_w - 1) - k,(r_h - 1) - j,(r_d - 1) - i)$ | |

TABLE 2

Symmetries (24–47).

| Symmetry | (i,j,k) → | Conditions |
|---|---|---|
| 24 | $(i,j,k)$ | $r_w = r_d$ |
| 25 | $((r_w - 1) - i,j,k)$ | |
| 26 | $(i,(r_h - 1) - j,k)$ | |
| 27 | $((r_w - 1) - i,(r_h - 1) - j,k)$ | |
| 28 | $(i,j,(r_d - 1) - k)$ | |
| 29 | $((r_w - 1) - i,j(r_d - 1) - k)$ | |
| 30 | $(i,(r_h - 1) - j,(r_d - 1) - k)$ | |
| 31 | $((r_w - 1) - i,(r_h - 1) - j,(r_d - 1) - k)$ | |
| 32 | $(j,i,k)$ | $r_w = r_h = r_d$ |
| 33 | $((r_w - 1) - j,i,k)$ | |
| 34 | $(j,(r_h - 1) - i,k)$ | |
| 35 | $((r_w - 1) - j,(r_h - 1) - i,k)$ | |
| 36 | $(j,i,(r_d - 1) - k)$ | |
| 37 | $((r_w - 1) - j,i,(r_d - 1) - k)$ | |
| 38 | $(j,(r_h - 1) - i,(r_d - 1) - k)$ | |
| 39 | $((r_w - 1) - j,(r_h - 1) - i,(r_d - 1) - k)$ | |
| 40 | $(k,j,i)$ | $r_w = r_h = r_d$ |
| 41 | $((r_w - 1) - k,j,i)$ | |
| 42 | $(k,(r_h - 1) - i,k)$ | |
| 43 | $((r_w - 1) - k,(r_h - 1) - j,i)$ | |
| 44 | $(k,j,(r_d - 1) - i)$ | |
| 45 | $((r_w - 1) - k,j,(r_d - 1) - i)$ | |
| 46 | $(k,(r_h - 1) - j,(r_d - 1) - i)$ | |
| 47 | $((r_w - 1) - k,(r_h - 1) - j,(r_d - 1) - i)$ | |

Pixel Operator

Once the range box is reduced to a box whose pixels can be put in one-to-one correspondence with the pixels in the domain set, and it has been transformed by the indicated symmetry, its pixel values are acted upon by a function f, which in the preferred implementation is given by a truncated contractive affine transformation, or mapping, $x \rightarrow trunc(ax+q)$, where a, and q are constant over the domain box and $|a|<1$ (in fact it suffices that $|a|<1$ for a majority of pixels). The coefficients a, and q are real numbers, and the truncation operation consists of rounding the real number $ax+q$ to an integer lying in a range of pixel values.

The next step in generating a codeword is to select, for each domain box a corresponding shrunken range box. A box with dimensions $b_w, b_h, b_d$ can be considered as a vector with $N=b_w \times b_h \times b_d$ components. Given two candidate boxes x and y there are a variety of well-known distance functions which may be used to compare the boxes. The following are some examples.

$L^p$ Distance

The easiest way to compare boxes is to treat each box as a vector and sum their component-wise distances. More generally, given a real number, p, the $L^p$ distance between boxes x and y is defined by:

$$d_p(x,y) = \left( \sum_{i=1}^{N} |x_i - y_i|^p \right)^{1/p}$$

where N is the number of pixels in each box. Of particular importance are the cases p=1, the Manhattan distance, and p=2 or Euclidean distance.

$L^\infty$ Distance

The $L^\infty$ or supremum distance is defined to be the maximum distance between any two pixel values. It is so-named because it may be obtained as a limit of the above distances as p becomes large.

$$d_\infty(x,y)=\max(|x_i-y_i|) \tag{4}$$

Weighted Distance

Figure 4:
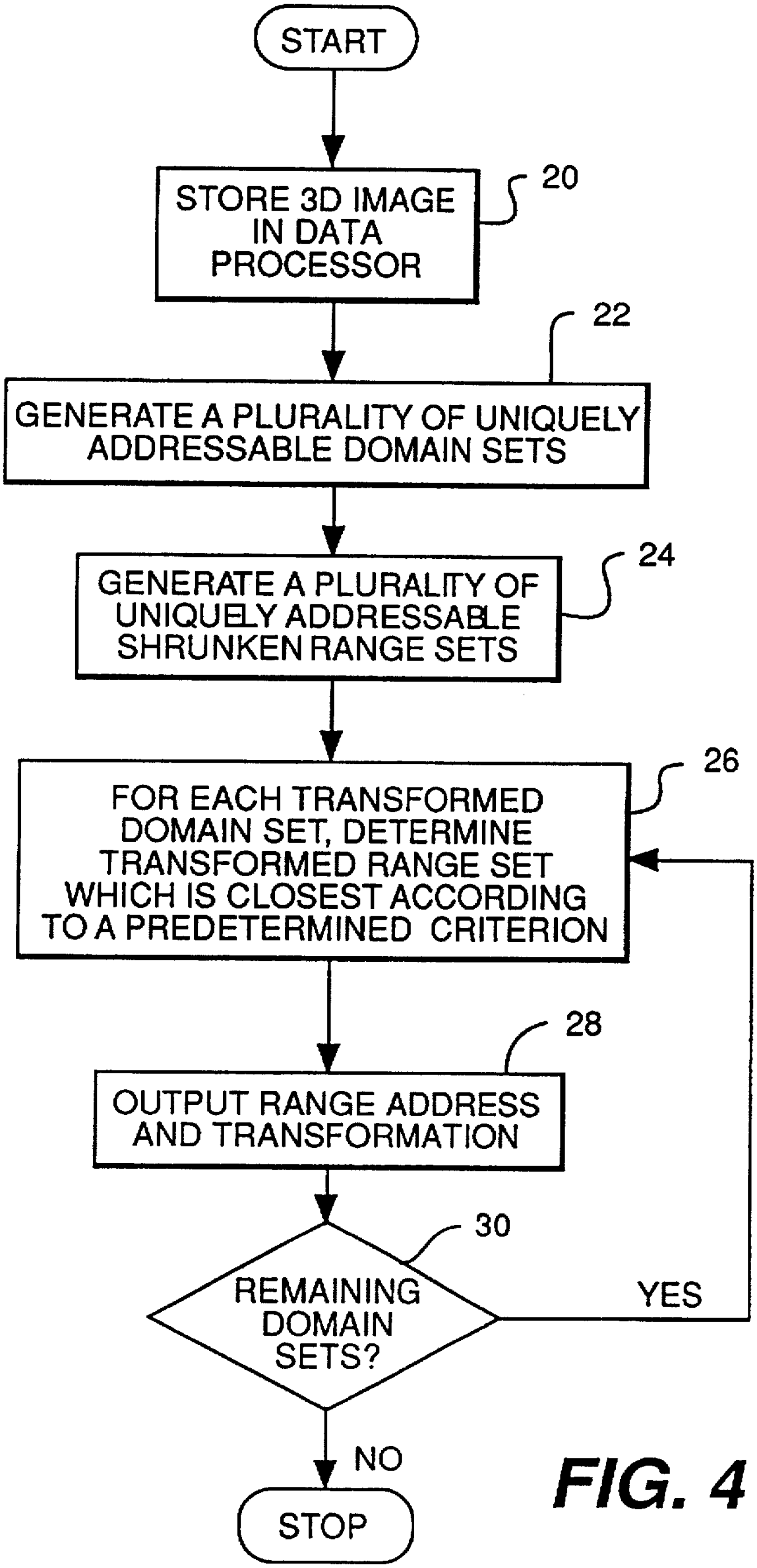
FIG. 4 is a logic flow diagram of a method for automatically compressing digital data representative of physical entity existing in three dimensions.

There are often criteria which aid in image compression which strictly lie outside the scope of what one would normally consider properties of a distance, which nevertheless can be implemented by modification of any of the above distance functions. For example it may be desirable to ensure that the range block lies close to the domain block, or that the range block shows a preference for a certain region of the image. Both of these example criteria can greatly facilitate additional compressions of the fractal codewords. In this case the distance function can be implemented as:

$$d(x,y)=d'(x,y)+C(x,y) \tag{5}$$

where d'is one of the aforementioned distance functions, and C is a cost function which can depend on properties of the boxes other than pixel values, such as their address. An example of a cost function is $C(x,y)=(u_d-u_r)^2+(v_d-v_r)^2+(w_d-w_r)^2$, where $(u_d,v_d,w_d)$ represents the address of the upper left corner of the domain block and $(u_r,v_r,w_r)$ represents the address of the upper left corner of the range block Encoding Using the principles described above the encoding (compressing) process will now be explained. Encoding, that is, transforming a three-dimensional image into a sequence of codewords, comprises the following steps (summarized in FIG. 4):

Storing digital data of a predetermined size arranged in a three dimensional format in a data processor (Step 20);

Generating a plurality of unique addressable three dimensional domain sets by dividing the array into a plurality of rectangular domain boxes such that all the domain sets collectively contain all the stored data (Step 22);

Generating a plurality of uniquely addressable three dimensional shrunken range sets by forming range boxes (Step 24);

Applying an affine transformation to each domain set and for each domain set, selecting a range set and a transformation performed on the range set (comprising reduction operator, symmetry operator, and pixel operator) satisfying one of the following criteria:

(a) the distance between the domain set and the transformed range set is the minimum possible over all range sets and transformations, or (b) the distance between the domain set and the transformed range set falls below a given threshold, or (c) the range set satisfies a secondary criterion and the distance between the domain set and the transformed range set falls below a given threshold (Step 26);

Outputting the address of the selected range set and the selected transformation as a codeword (Step 28); and Repeating the process for each domain set (Step 30).

The codeword corresponding to the given domain set consists precisely of a description of the address of the selected range set and the transformation. Each domain set will be represented by a codeword in the compressed image file.

Alternatively, an affine transformation may be applied to each shrunken range set relating a domain set and transformation satisfying one of several criteria.

An example of a "secondary criterion" noted above is that the address of the selected transformed range block is close to the domain block. For example, $(u_d-u_r)^2+(v_d-v_r)^2+(w_d-w_r)^2<R$, where R is some fixed constant greater than zero.

Figure 5:
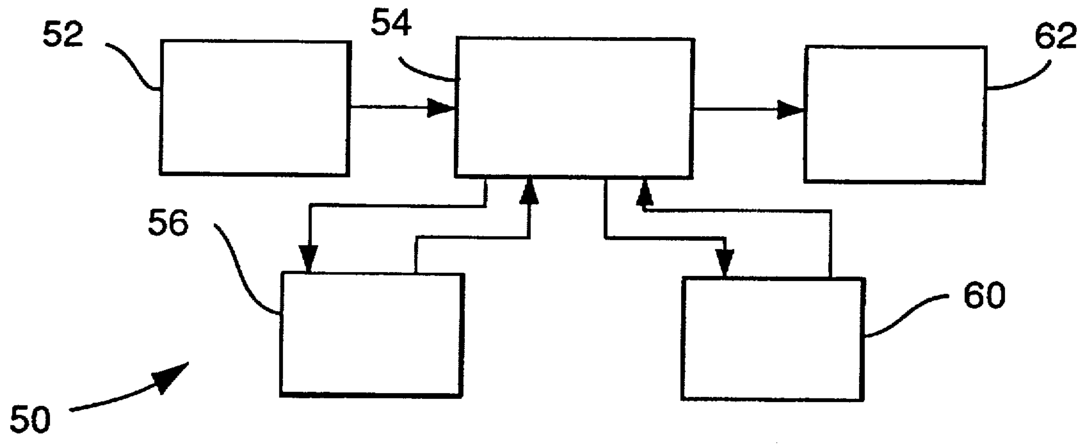
FIG. 5 is a block diagram of encoder apparatus which can execute the method of FIG. 4.

The method set forth above can be performed in encoder apparatus as shown in FIG. 5. An input device 52 supplies digital data to a processor 54. The input device 52 may, for example, be a document scanner or a computerized axle tomography (CAT) machine.

The processor 54 stores the digital data supplied by the input device 52 into a memory 56 in the form of a three-dimensional data set of predetermined size. The processor 54 generates a set of uniquely addressable three-dimensional domain boxes from the stored digital data. Each of the domain boxes represents different portion of the stored digital data such that all of the domain boxes together contain all of the stored digital data. The processor also creates, from the stored digital data, a set of uniquely addressable three-dimensional mapped range boxes each corresponding to one of a plurality of three-dimensional subsets of the digital data. Each of the subsets has a unique address such that each mapped range box comprises a shrunken version of one of the subsets of the digital data which corresponds to the mapped range box. Thus, there is a one-to-one correspondence between values of the domain boxes and the values of the mapped range boxes. The processor assigns unique box identifiers to corresponding ones of the mapped range boxes. Each of the box identifiers specifies for the corresponding mapped range box an address of the corresponding subset of digital data. The processor also performs an affine transformation on the domain boxes.

A comparator 60 coupled to the processor 54 then compares the range boxes and the transformed domain boxes and selects, for each of the domain boxes, one of the range boxes which is most similar.

A plurality of affine transformations comprising pixel operators, and a plurality of symmetry operations are performed upon the domain boxes and the comparator 60 determines the pixel operator and symmetry operator for the domain box which yields the greatest similarity to a range box. The comparator then provides an identification of the selected pixel operator, symmetry operator, and range box address which yields the greatest similarity. The processor 54 forms a codeword for each domain box comprising an identifier pair. Each identifier pair includes a range box identifier and a transformation identifier, including pixel operator identifier and symmetry operator identifier.

The comparator 54 provides the codewords to an output device 62 which supplies the set of codewords as a compressed representation of the digital data of the original data set. This compressed representation is of a size smaller than the predetermined size of the original three-dimensional data set. The output device 62 may comprise a storage device such as a hard disk, or a communications device such as a modem.

In a preferred embodiment, the processor 54, memory 56 and comparator 60 are implemented in a general purpose computer such as an Indigo 2 work station commercially available from Silicon Graphics, Inc. Alternatively, all or part of the decoder 50 can be implemented in custom hardware for high speed applications.

The Basic Decoder

A digital file consisting of the codewords described above can be decompressed to recover a close representation of the original array through a decompression, or decoding, process performed in a data processor. In the preferred implementation, the data processor has an input buffer for receiving the digital file, and two image buffers of the desired decompression dimensions of the decompressed array. It is an advantage that the decompressed array dimension need not be the same as the dimensions of the original array before compression.

Figure 6:
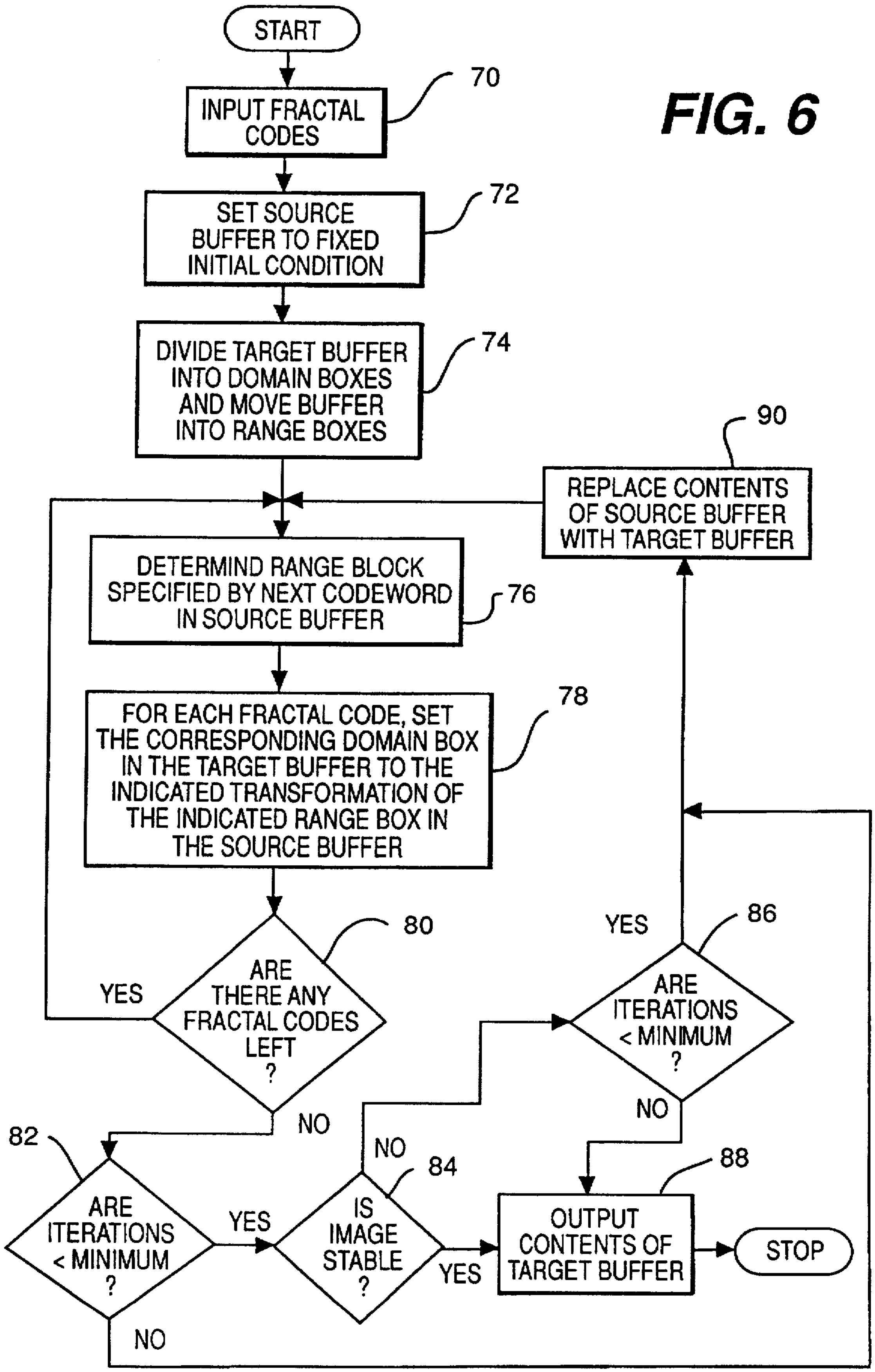
FIG. 6 is a logic flow diagram of a method for processing digital data values representative of a physical entity existing in three dimensions to produce a representation of original data encoded by the method of FIG. 4.

The sequence of codewords defines a transformation, T, on the image buffers. The decoding procedure is shown in FIG. 6. In a preferred form, the procedure consists of:

Receiving the compressed digital file, consisting of fractal codes into an input buffer (Step 70);

Initialize a source buffer to a predetermined starting condition (for example neutral gray) as a three-dimensional array (Step 72);

Dividing a target buffer into domain boxes and the source buffer into range boxes (Step 74);

For each codeword of the input buffer, processing the corresponding domain box in the target buffer TO determine the range box given by the corresponding codeword in the source buffer. (Step 76) If the new dimensions are different from the original dimensions (as determined before compression of the original data), this may require proportionate resealing of the range address;

Replacing the contents of the domain box in the target buffer with the result of transforming (shrinking) the range box in the source buffer by the transformation described by the corresponding codeword (Step 78);

Repeating steps 76 and 78 for each codeword (Step 80);

After domain boxes of the target buffer have been replaced, that is, one iteration has been completed, determining if a preset minimum number of iterations have been performed (Step 82). If not, the contents of the source buffer are replaced with the target buffer (Step 90) and steps 76 and 78 are repeated for each domain box.

If the minimum number of iterations has been performed determining if the difference between source and target buffer is less than a predetermined threshold, that is, whether the image is stable (Step 84). If not, determining if a predetermined maximum number of iteration have been performed (Step 86). If not, go to step 90.

If the difference between the source and target buffers is less than the threshold or the predetermined maximum iteration have been performed, outputing the contents of the target buffer as a representation of the array (Step 88).

Figure 7:
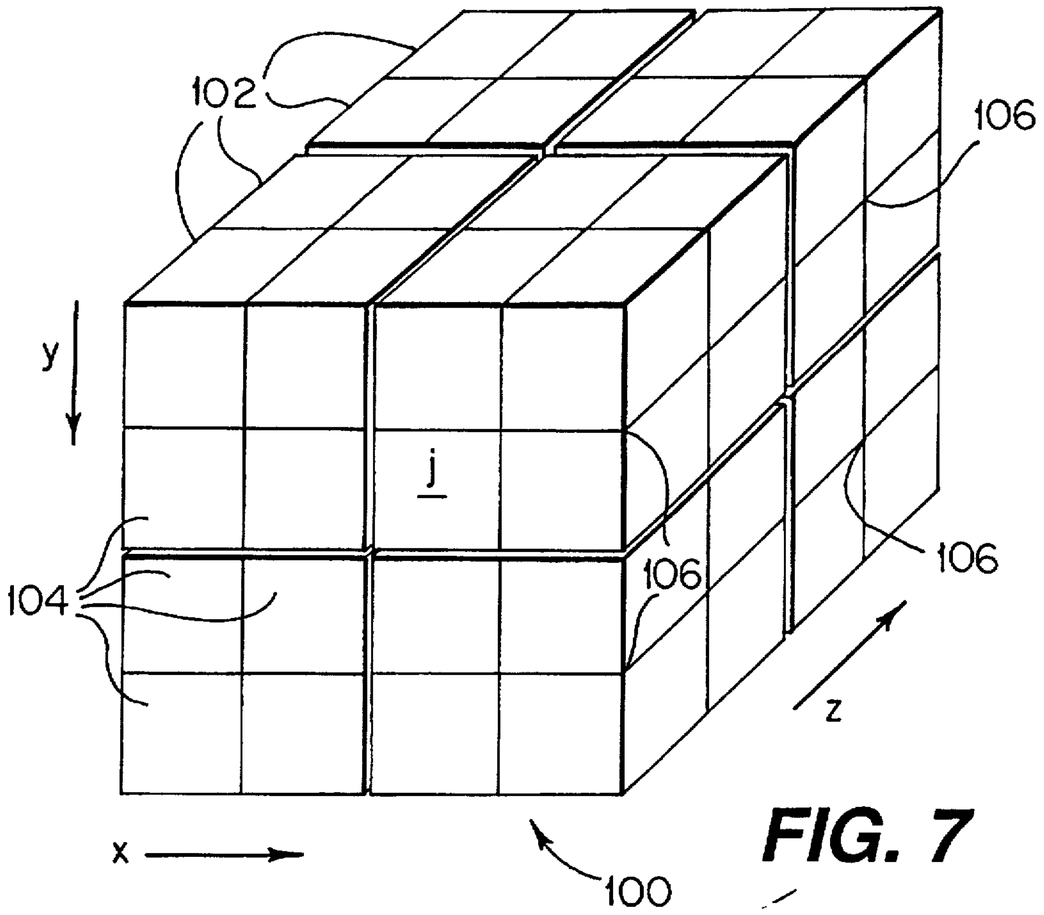
FIG. 7 shows a simplified three-dimensional data array representing a series of images.

A numerical example of a decoding operation performed on a simplified three-dimensional data array 100 is illustrated in FIGS. 7, and 8, and 9 and in Table 3. The data array 100, shown in FIG. 7, includes four frames 102 each including 16 members 104. In this example, the array 100 represents a series of images each corresponding to a frame 102 and including 16 pixels 104 each having a pixel brightness value. However, the array 100 could represent other data, such as voice data over time or any other type of physical entity which can be represented in three dimensions of data. The pixel values can thus be represented as the numerical array 100 having x, y, and z dimensions.

As can be seen in FIG. 7, the horizontal position of a particular pixel is represented by its x coordinate (increasing to the right). The vertical position of the pixel is indicated by its y coordinate (increasing in a downward direction) and the frame number of each pixel (that is, the depth of the pixel) is indicated by the z coordinate (increasing in value toward the rear).

Values of these pixels can be stored in an array of computer memory in the manner shown in FIG. 8. The memory address is shown at the left, beginning at 0000 and increasing in hexadecimal value in a downward direction. The pixel values are stored in the locations of memory indicated by the memory address. For example, the pixel j of FIG. 7 can be indicated by its x,y,z coordinates of 2,1,0. The brightness value of this pixel can be represented by $V_{2,1,0}$. This value will be stored at the memory location indicated by the address 0006 FIG. 8.

The 4×4×4 pixel array of FIG. 7 is separated into eight 2×2×2 domain blocks 106. The range block for the array shown in FIG. 7 is a block of 4×4×4 pixels. Thus, in the array of FIG. 7 there is only a single range block, namely, the entire array 100, for purposes of simplified explanation.

Since the array of FIG. 7 includes eight 2×2×2 domain blocks, the pixel values of this array can be represented in compressed form as a fractal transform consisting of eight codewords, one for each domain block. As noted above, the value of each codeword consists of a range block address and a transform. In this simplified example, there is only a single range block. Thus, the range block address of each of the codeword corresponding to the domain blocks of the array of FIG. 7 are the same.

In the example, the pixel operator of each codeword is of the form ax+q. Moreover, the "a" values for each codeword of this example are the same. Thus, the eight codewords making up the fractal transform of this example include only q values, as indicated in Table 3. The assumption that the a value of each codeword is the same occurs quite often in actual fractal transform applications.

The fractal transform code of the array of FIG. 7 is shown in Table 3. As can be seen, each entry in Table 3 corresponds to a domain block number ranging from 0–7. The x,y,z coordinates of these domain blocks of the array 100 are indicated in the second column of Table 3. Finally, the q values for each domain block are shown in Table 3. Since the range block address and the a value are the same for each of the eight domain blocks, the set of q values comprises the entire fractal transform code of the array shown in FIG. X.

TABLE 3

| Block | address | q |
|---|---|---|
| 0 | (0,0,0) | 0 |
| 1 | (2,0,0) | 32 |
| 2 | (0,2,0) | 32 |
| 3 | (2,2,0) | 64 |
| 4 | (0,0,2) | 32 |
| 5 | (2,0,2) | 64 |
| 6 | (2,2,0) | 64 |
| 7 | (2,2,2) | 96 |

The pixel values of the original image represented by array 100 of FIG. 7 will now be derived in a numerical example derived from the principles of the present invention. FIG. 9 shows the contents of a computer memory array including sixty four locations each initialized to an arbitrary value. In the present example, the brightness values of the original image are specified to vary from 0 to 255. A neutral gray value is represented by the midpoint of this pixel brightness range, namely, 128. Thus, each of the sixty four locations of the computer memory is initialized to an arbitrary value of 128.

The initial values of this array are indicated in FIG. 9 at iteration #0. It can be seen that the x and y coordinates of the computer array indicated in FIG. 9 corresponds to the x and y coordinates of the pixels of the array of FIG. 7. Similarly, the frame number of the computer memory of FIG. 9 corresponds to the frame number of the pixel array of FIG. 7, that is, the z coordinate.

In the present example, as noted above, the range block consists of a single range block of dimensions of 4×4×4. A range block shrunken to the same size as the domain blocks is thus a 2×2×2 block of values indicated in FIG. 9 as the range block.

The reduction operator used to produce the shrunken range blocks consist of selecting alternate pixels of the array of FIG. 7. Thus, the corresponding memory locations used to form the range block of iteration #0 are indicated by circled values in the frames of iteration #0, FIG. 9.

As can be seen at iteration #0 of FIG. 9, the shrunken range block consists of an array comprising a pair of 2×2 frames, namely, frame A and frame B. In a first iteration, iteration #1, the pixel values of the first domain box of the array of FIG. 7, represented in computer memory in FIG. 9, are formed by applying a transformation such that the next iteration domain box value $V_d$ equals $aV_r+q$, where $V_r$ represents the shrunken range box value. Referring to Table 3, it can be seen that the q value for domain box 0 is 0. Since the "a" value for all domain boxes is ½, the value of each domain pixel is equal to one-half of the corresponding range box pixel value plus 0. It can be seen that the four upper left values of frame 0, iteration #0 are 64, which is one-half of the corresponding range box values shown at frame A of iteration 0. Similarly, the remaining values of first domain box at iteration 1, represented by the four upper left values of frame 1, iteration 1 are also 64 which is one-half of the corresponding range box values of frame B iteration 0.

Domain box number 1 is indicated in FIG. 7 as the four pixels at the upper right corner of frame 0 and the four pixels of the upper right corner of frame 1. The fractal transform code for domain box 1 has a q value of 32. Therefore, the pixel values of domain box 1 are updated at iteration #1 by applying the fractal transform code including an a value of one-half and a q value of 32 to the corresponding pixels of the shrunken range box of iteration #0. This is indicated at iteration #1 of FIG. 9 to which the four upper right pixel values of iteration #1, frame 0 have a value of 96, obtained by (one-half times 128) plus 32. Similarly, the second frame of domain box number 1 consists of the four upper right pixel values of frame 1 iteration #1, also each having a value of 96.

Skipping over to domain box 3 which consists of the lower right four pixels of the first two frames of the array of FIG. 7, it can be seen from chart X that the fractal transform of domain block 3 has a q value of 64. Applying the fractal transform code for domain box 3 to the pixel values of the shrunken range box of iteration #0 yields domain box values of 128, as shown in the four lower right values of frame 0 iteration #1 and the four lower right values of frame 1 iteration #1.

In a similar manner, all of the domain box values for iteration #1 are derived by applying the fractal transform $a(V_r)+q$. The pixel values for the domain boxes after iteration #1 are indicated in FIG. 9. A shrunken range box is formed from the pixel values of iteration 1 by selecting every other pixel (indicated by circled values) to form two frames of a 2×2 array. As can be seen from FIG. 9, the first frame of the shrunken range box consists of pixel values (left to right, up to down) of 64, 96, 96, 128 and the second frame consists of pixel values 96, 128, 128, 160. This is obtained by selecting the circled pixel values of domain boxes of iteration #1.

Applying the fractal transform code for the eight domain boxes to the shrunken range box values of iteration #1 yields the pixel values of domain boxes shown at iteration #2. The process continues through iterations #7 and #8. The pixel values of the domain boxes of iteration #8 yield the pixel values of the shrunken range box shown in the lower portion of iteration #8. It can be seen that applying the fractal transform values for domain boxes 0 through 7 to the shrunken range box values of iteration #8 yields domain box values of iteration #9 which are identical to that of iteration #8. Thus, the pixel values have stabilized, or converged, after nine iterations such that the pixel values of iterations #8 and #9 represent the pixel values of the original array of FIG. 7 prior to compression.

While the above description assures that all pixel values are iterated an equal number of times, as an alternative one can use a single buffer in which case the values used at each step are a combination of old and new values. Not only does this produce a memory saving, it speeds the rate of convergence.

Decoding by means of Linear Equations

If pixel operators are restricted to those which are affine (have the form $x \rightarrow ax+q$), the decoding process can be realized by inverting a large sparse matrix. The correspondence between range and domain pixels set up by the fractal codes is equivalent to finding a fixed point of the matrix operation:

$$X=AX+Q \tag{6}$$

where X, and Q are vectors with as many components as the number of pixels in the entire image, and A is a square matrix with as many rows and columns as there are pixels in the image.

Provided a fixed point exists (and it can be shown mathematically that under suitable restrictions on the local affine maps, a fixed point must exist), this fixed point has an analytical expression of the form:

$$X=(I-A)^{-1}Q \tag{7}$$

where I is an identity matrix of the same size as A. In the special case where Q=0, the calculation amounts to finding an eigenvector for A by procedures well-known in the art. The matrix Q is often sparse. The degree of sparsity depends on the method by which range boxes are transformed to reduced range boxes. In the subsampling case, A has one non-zero element per row off the diagonal, and in the averaging case it has eight. Although the ability to implement the decoding process of the present invention by the use of linear algebraic techniques to solve this sparse system of equations is advantageous in certain applications, those skilled in the art will recognize that other implementations are, of course, possible.

Encoding Video Images

Another aspect of the invention concerns the encoding of three-dimensional data arrays which are available sequentially or whose size makes it impractical to deal with the entire data set in memory at one time. An example of such an array is a series of video images. In such application, it is desirable to add constraints on the relationship between the domain box and the possible addresses of range boxes of the described transform. A second unique feature of the invention is that range boxes are assumed to come not from the image but from the image after it has undergone encoding and decoding.

Assume that the image is represented by a sequence of frames $X_{i,j,k}$ as shown in FIG. 1. However, in this case the possibility exists that the depth determining the size of k is either very large or in fact it may be the case that there is no bound on k ahead of time as would be the case if one were receiving a video signal. This situation is illustrated in FIG. 10.

Figure 10:
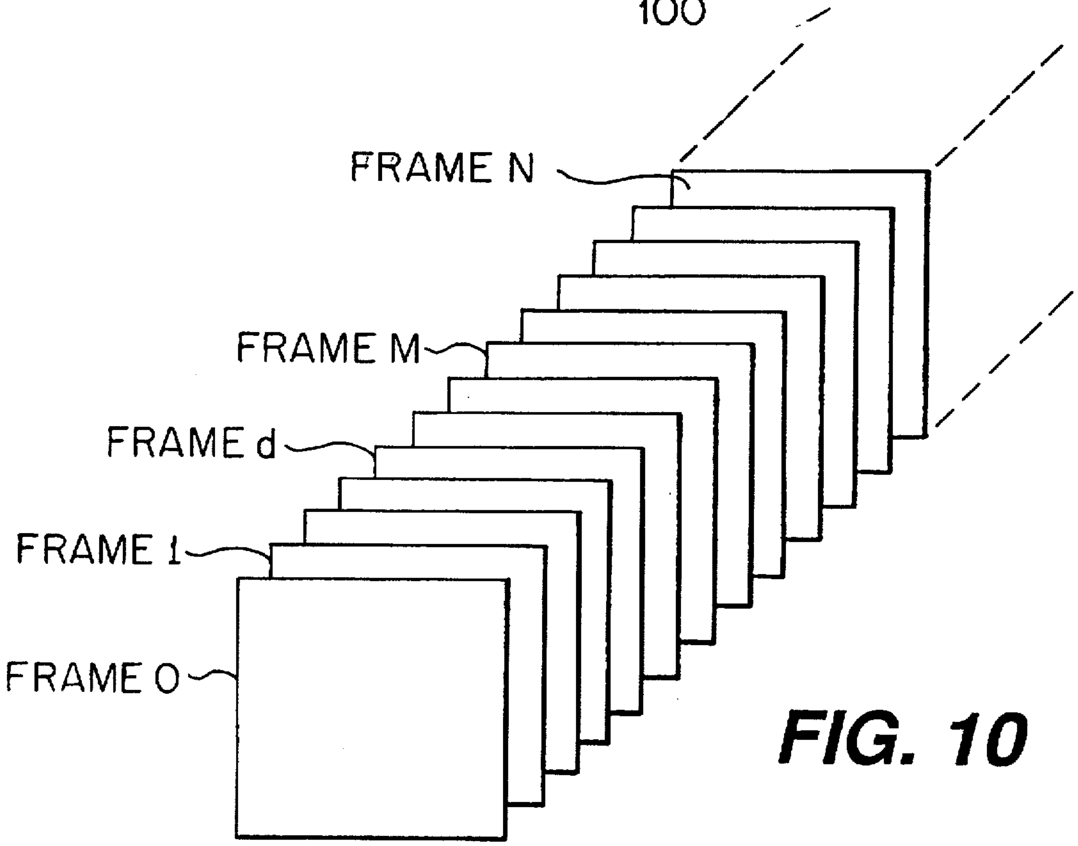
FIG. 10 shows an array of video information arranged as a series of frames.

An initial frame box size N and context size M and frame depth d are chosen ($d \leq M \leq N$ and usually $d<N$) as shown in FIG. 10. The method of this embodiment includes the steps shown in FIG. 11. N frames are loaded into an input buffer (step 120). Next, frames 1 to N are encoded by the 3D fractal transform in the manner described and shown in FIG. 4 (step 122). Frames 1 to N are then decoded in the manner described and shown in FIG. 6 and the decoded box of N frames is stored into a range array (step 124). An additional number of frames d are loaded into the input buffer (step 126). Frames N+1 to N+d are then encoded in the manner described above with the constraint that the range boxes are taken from decoded frames N−M+1 to N constructed in step 124. (Step 128). Codewords for frames N−M+1 to N are sent to an output file (step 130). If frames remain to be coded (step 132), frames N+1 to N+d are decoded in the manner described above (step 134). In the range buffer the first d frames are deleted (step 136) and steps 126–132 are repeated until all frames have been encoded. After m+1 iterations, frames N+md+1 to N+(m+1)d are encoded in terms of decoded frames N+md+1−M to N+md.

In some applications, it is desirable to utilize the localization of the range boxes by storing the z (or temporal) component, that is, the frame number of the range address in the codeword as an address relative to the current frame, rather than an absolute number. In a preferred embodiment, N may equal 16, M may equal 8, and d may equal 4.

Figure 11:
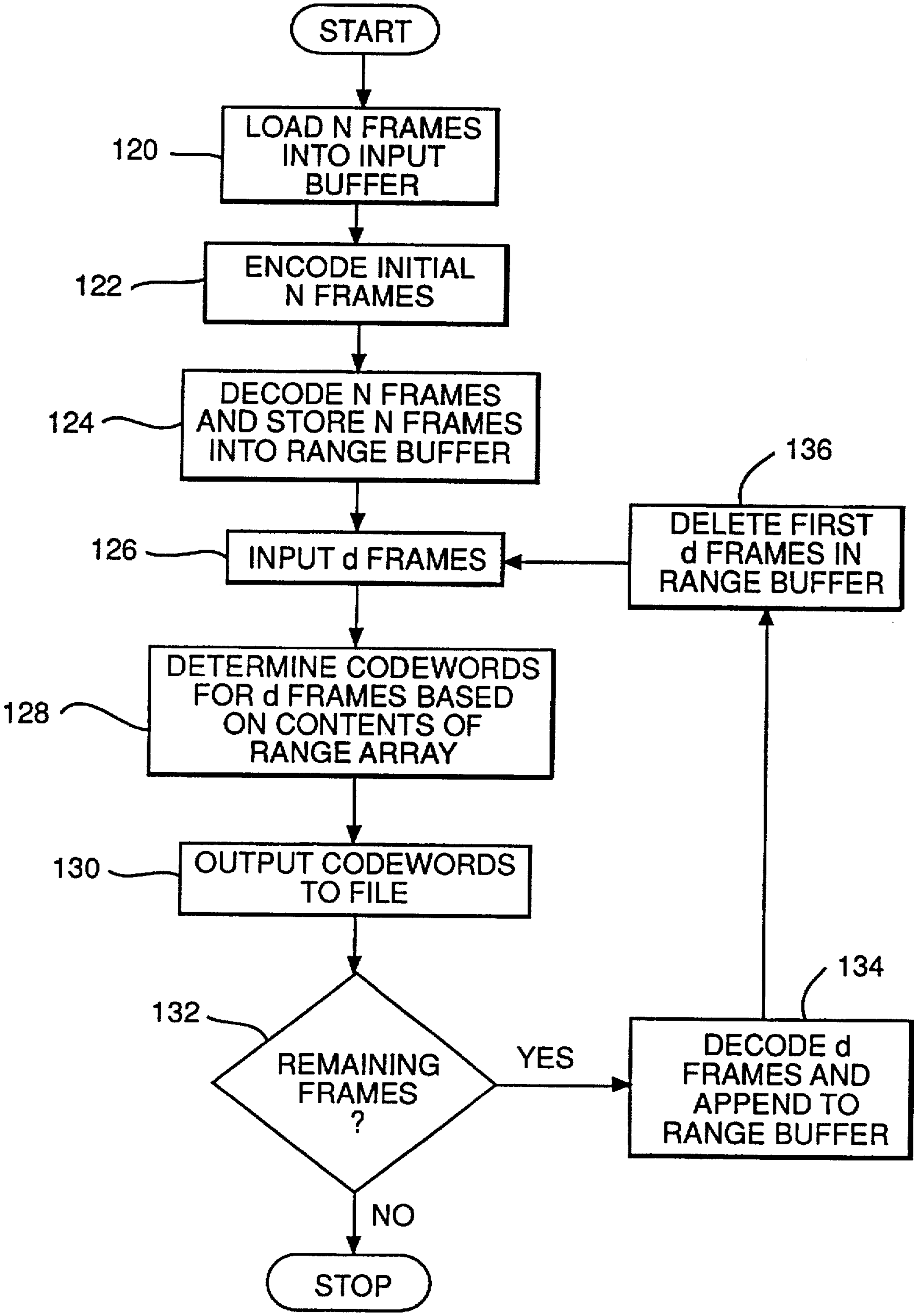
FIG. 11 is a logic flow diagram of a method for automatically compressing digital data representative of a physical entity existing in three dimensions in which the third dimensions constitutes a frame number.
Figure 12:
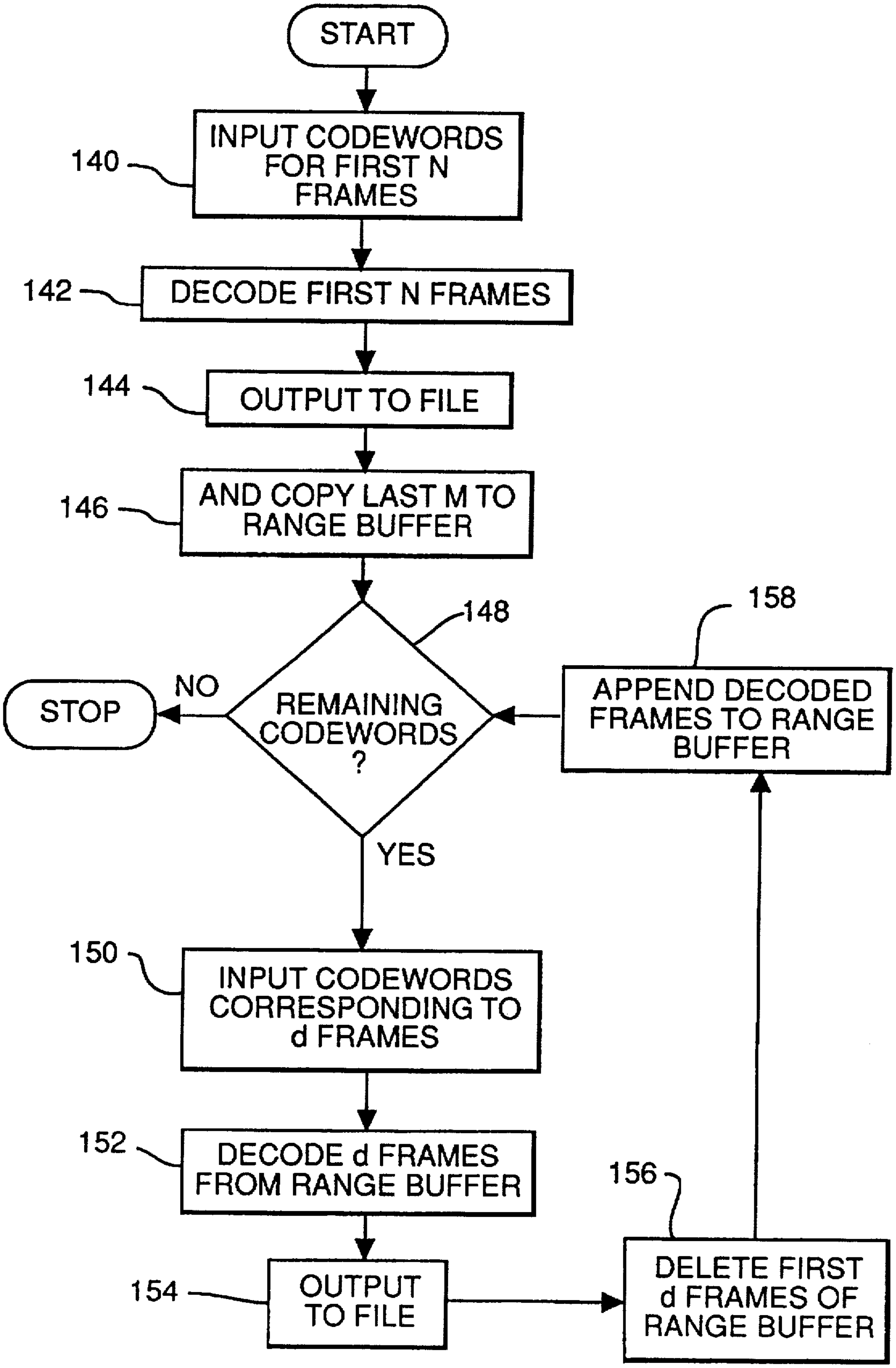
FIG. 12 is a logic flow diagram of a method for processing digital data values representatives of a physical entity existing in three-dimension, the third dimension constituting a frame number, to produce a representation of a original data set encoded by the method of FIG. 11.

A process for decoding data encoded by the process of FIG. 11 is shown in FIG. 12. The codewords for frames 1 to N are read into an input buffer of a data processor (step 140) and frames 1 to N are decoded by means of the three-dimensional transform described above in FIG. 6 (step 142). In particular, the described transformation is iterated for a prescribed number of iterates or until a fixed stability criterion is met. The first N frames are supplied as output (step 144).

The last M frames of the data decoded in step 142 are stored in a range buffer (step 146). If additional codewords remain to be decoded (step 148), codewords for frames N+1 to N+d are read (step 150) and frames N+1 to N+d are decoded (step 152) by a single application of the described transformation to the range values derived from the previous M frames stored in step 146. The newly decoded frames are supplied as output (step 154). The first d frames are deleted from the range buffer (step 156) and the newly decoded frames are appended to the range buffer (step 158). This procedure continues until all codewords have been exhausted at which point the entire image will have been decoded.

The parameters N, M, d used in decoding do not have to be the same as those used in encoding. As was the case in the standard three-dimensional fractal transform, the number of frames, the picture dimensions, and the aspect ratios are all adjustable at decode time. Thus any desired size, resolution, or aspect ratio can be achieved by suitable chains of parameters in the decoding process. In particular, adjustment of these parameters permits features of zooming and interframe interpolation.

Figure 13:
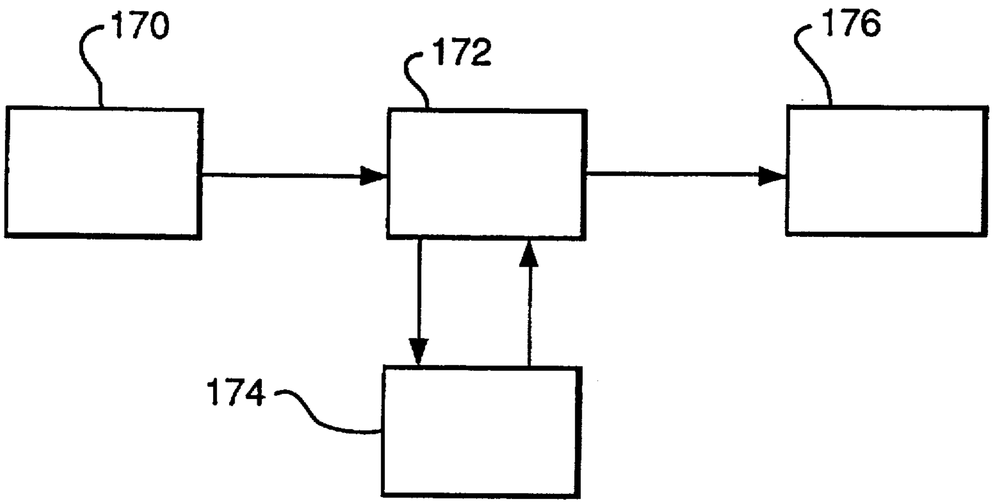
FIG. 13 is a block diagram of apparatus for performing the method of FIG. 12.

A preferred embodiment of apparatus incorporating the principles of the present invention is shown in FIG. 13. An input buffer 170 is provided to receive codewords. The input buffer 170 is coupled to a processor 172. A range buffer 174 is also coupled to the processor 172. The processor 172 decodes codewords from the input buffer which are representative of the original data set according to a predetermined process using range box data and domain box data to obtain output data corresponding to the original data set. This process may correspond to the process shown in FIG. 12.

After decoding a set of codewords representing, for example, N frames of original data, the processor 172 copies a portion of the output data into the range buffer 174. This portion may represent, for example, M frames of original data, where M is less than N. The processor 172 then decodes codewords from input buffer 170 which is representative of additional frames of the original data set according to the predetermined process using data copied to the range buffer to generate range box data required by the decoding process. Additional output data is thus obtained. The processor periodically replaces output data copied to the range buffer on a first-in, first-out basis.

An output device 176 coupled to the processor 172 supplies output data as decompressed data representative of the original data set. In the preferred embodiment, the input buffer 170, the processor 172, and the range buffer 174 are incorporated in a general purpose computer such as an Indigo #2 work station commercially available from Silicon Graphics, Inc. The output device may comprise a memory device such as a hard disk or it may comprise a modem. Alternatively, the input buffer 170, processor 172, and range buffer 174 may be implemented in specialized hardware for high speed applications.

In many applications one is only interested in viewing a subset of a large image. In this case there is a more sophisticated decoding method which is faster than the approach above and which allows decoding an arbitrary subset of an image.

The codewords describing a compressed image determine a series of correspondences among pixels. Pixel y is a predecessor of pixel x if:

y lies in the range box corresponding to the domain box containing y; and y corresponds under the reduction and symmetry operator to the pixel mapped to x by the pixel map.

In simpler terms, x depends on y if a change in y could possibly yield a change in the decoded value of x.

The new decode method comprises:

1. Set aside a buffer of integers, one for each pixel, and set a total number of iterations, N.
2. Assign all pixels number 1. Let n=1.
3. Assign to all pixels which are predecessors of pixels at level n, level n+1.
4. Let n=n+1.
5. In n<N goto step 3.
6. Decode all pixels at level N, for N iterations.
7. Let n=N−1.
8. Decode all pixels at level n by a single iteration. Let n=n−1.
9. If n=0 quit.

Figure 14:
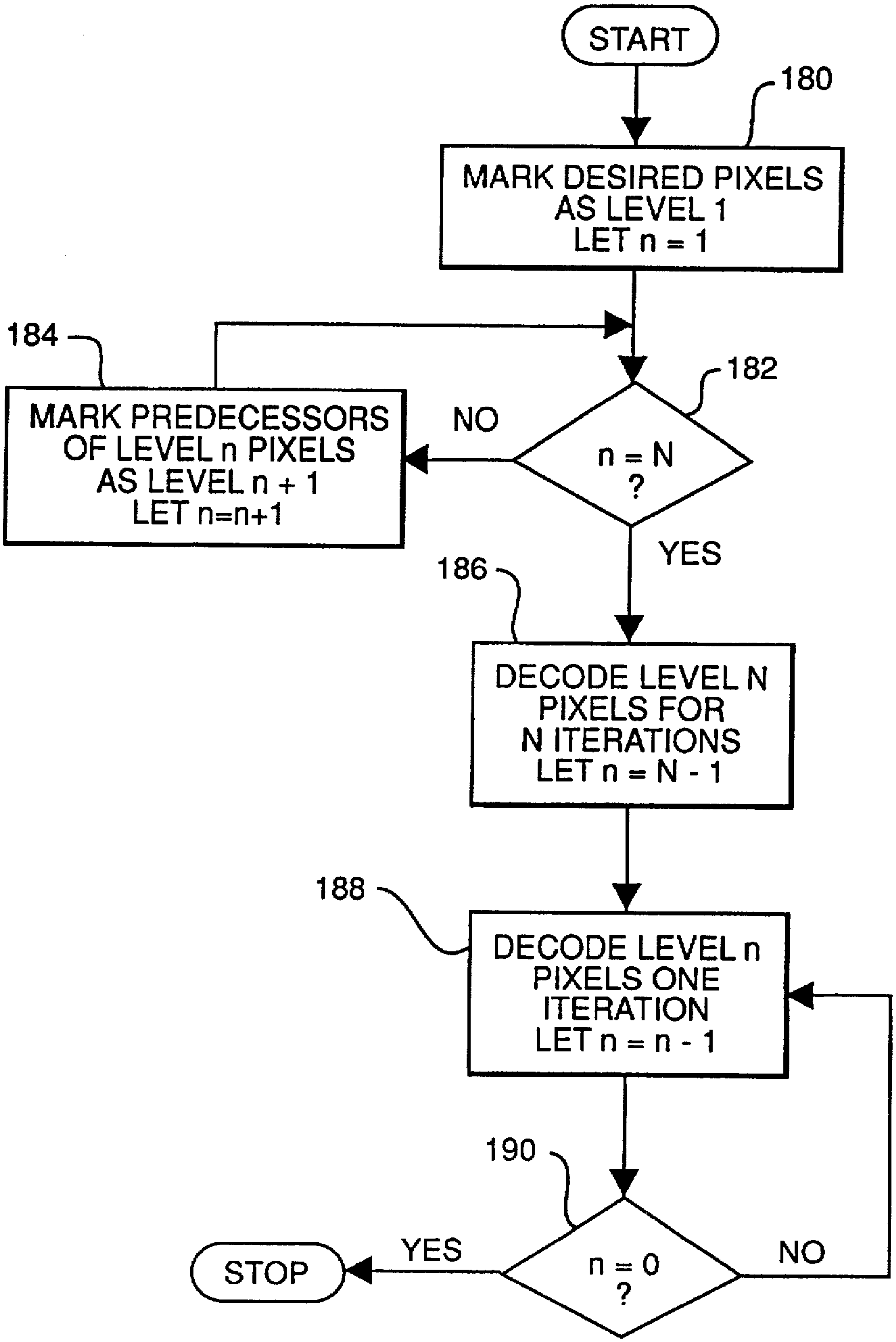
FIG. 14 is a logic flow diagram of a method for decoding a subset of the original data.

To decode a subset of the image one just implements the above steps with the proviso that only the desired subset of the image is assigned to level 1. This method is shown in steps 180 through 190 of FIG. 14. It is an improvement of the "pixel chaining" method described in the aforementioned U.S. Pat. No. 5,347,600.

The apparatus and methods described above comprise a preferred embodiment of the present invention. However, it will be apparent to those skilled in the art that various modifications and variations can be made in the apparatus and methods of this invention without departing from the spirit or scope of the present invention. For example, other types of hardware and computer devices may be employed to practice the methods of the present invention. Moreover, other values of parameters, other types of shrinking, averaging, and image distance calculation techniques may be employed, and various box sizes and shapes may be employed. The present invention covers such modifications and variations which are within the scope of the appended claims and their equivalents.

We claim:

1. A method for automatically compressing digital data representative of a physical entity existing in three dimensions, comprising the steps performed by a data processor of:

storing the digital data in a three-dimensional data set of predetermined size in the data processor;

generating a set of uniquely addressable three-dimensional domain boxes from the stored digital data, each of the domain boxes representing a different portion of the stored digital data such that all of the domain boxes together contain all of the stored digital data;

creating, from the stored digital data, a set of uniquely addressable three-dimensional mapped range boxes each corresponding to one of a plurality of three-dimensional subsets of the digital data, with each of the subsets having a unique address, the creating step for each mapped range box including the substep of shrinking the one of the subsets of the digital data which corresponds to the mapped range box such that there is a one-to-one correspondence between values of the domain boxes and values of the mapped range boxes;

assigning unique box identifiers to corresponding ones of the mapped range boxes, each of the box identifiers specifying for the corresponding mapped range box an address of the corresponding subset of digital data;

performing a first affine transformation on a first set of boxes of the stored-digital data comprising one of the domain box set and the mapped range box set, wherein a second set of boxes of the stored digital data comprises the other of the domain box set and the mapped range box set, and wherein the first affine transformation applied to each of the boxes of the first set has a corresponding transformation identifier;

forming, for each of the domain boxes, a selected pair of boxes, each box pair including one box from each of the first and second box sets, one of the boxes of each pair being the box of its corresponding set which most closely corresponds to the other box of the pair according to predetermined criteria; and supplying a set of codewords each comprising an identifier pair as a compressed representation of the digital data in a data set of a size smaller than the predetermined size, each identifier pair corresponding to a different one of the formed selected box pairs, each of the identifier pairs comprising a box identifier associated with one of the boxes of the corresponding box pair and a transformation identifier associated with one of the boxes of the corresponding box pair.

2. A method as recited in claim 1 wherein:

the first set of boxes comprises the set of mapped range boxes;

each box pair comprises a domain box and a transformed mapped range box; and each of the identifier pairs comprises a mapped range box identifier and a transformation identifier associated with a transformation applied to a mapped range box.

3. A method as recited in claim 1 wherein the step of creating mapped range boxes comprises the step of creating mapped range boxes including an escape box containing digital data in which all bits have the same value.

4. A method as recited in claim 1, wherein the predetermined criteria comprises selecting boxes of the first and second sets which are separated by the minimum distance.

5. A method as recited in claim 4, wherein the predetermined criteria comprises selecting boxes of the first and second sets which are separated by the minimum Hausdorf distance.

6. A method as recited in claim 1, wherein the step of creating mapped range boxes comprises changing the pixel values of at least one of the range boxes by a predetermined mapping function and wherein the step of supplying a set of codewords comprises supplying a set of codewords including a description of the predetermined mapping function.

7. A method as recited in claim 1 wherein the transformation identifiers comprise a symmetry operator associated with one of the boxes of the corresponding box pair.

8. A method as recited in claim 1 wherein the transformation identifiers comprise a pixel operator associated with one of the boxes of the corresponding box pair.

9. A method as recited in claim 8 wherein the pixel operator includes a multiplier and an additive term.

10. A method for processing digital data values representative of a physical entity existing three dimensions to produce a representation of an original data processor from a set of identifier pairs, the original data value set is represented in an array having three axes each with an upper limit, the data processor including a memory having a plurality of buffers each having a plurality of addressable areas specified by a buffer address and each of the identifier pairs corresponding to an addressable area in the buffers and including a buffer address and a procedure specification, at least one of the identifier pairs representing a first predetermined pattern of digital data, the method comprising the steps, performed by the data processor, of:

storing a second predetermined pattern of digital data values in one of the buffers designated as a source buffer:

determining, for each of the identifier pairs, a pattern of data values corresponding to each identifier pair by applying the procedure specified in that identifier pair to the portion of the source buffer indicated by the buffer address in that identifier pair;

storing the patterns of data into the addressable area of another one of the buffers, designated as a target buffer, indicated in the corresponding identifier pair;

repeating the determining and target buffer storing steps, with the target buffer being considered as the source buffer, until predetermined criteria are met; and providing the contents of the target buffer as data values representative of the original data value set when the predetermined criteria are met;

the source and target buffers being arranged in an array having three axes, corresponding to the original data value set array axes, each source and target buffer array axis having an upper limit; and at least one of the source and target buffer array axis upper limits differing from the corresponding original data value set array axis upper limit, whereby the representative data values constitute a representation of the original data value set at a resolution different than the original data value set.

11. A method as recited in claim 10 wherein only a portion of the original data value set is processed.

12. Apparatus for automatically compressing digital data representative of a physical entity existing in three dimensions, comprising:

an input device for supplying digital data;

a memory for storing the digital data in a three-dimensional data set of predetermined size in the data processor;

a data processor for generating a set of uniquely addressable three-dimensional domain boxes from the stored digital data, each of the domain boxes representing a different portion of the stored digital data such that all of the domain boxes together contain all of the stored digital data; for creating, from the stored digital data, a set of uniquely addressable three-dimensional mapped range boxes each corresponding to one of a plurality of three-dimensional subsets of the digital data, with each of the subsets having a unique address such that each mapped range box comprises a shrunken version of the one of the subsets of the digital data which corresponds to the mapped range box such that there is a one-to-one correspondence between values of the domain boxes and values of the mapped range boxes; for assigning unique box identifiers to corresponding ones of the mapped range boxes, each of the box identifiers specifying for the corresponding mapped range box an address of the corresponding subset of digital data; and for performing a first affine transformation on a first set of boxes of the stored digital data comprising one of the domain box set and the mapped range box set, wherein a second set of boxes of the stored digital data comprises the other of the domain box set and the mapped range box set, and wherein the first affine transformation applied to each of the boxes of the first set has a corresponding transformation identifier;

a comparator for comparing boxes of the first and second sets and for selecting, for each of the domain boxes, a selected pair of boxes, each box pair including one box from each of the first and second box sets, one of the boxes of each pair being the box of its corresponding set which most closely corresponds to the other box of the pair according to predetermined criteria; and an output device for supplying a set of codewords each comprising an identifier pair as a compressed representation of the digital data in a data set of a size smaller than the predetermined size, each identifier pair corresponding to a different one of the formed selected box pairs, each of the identifier pairs comprising a box identifier associated with one of the boxes of the corresponding box pair and a transformation identifier associated with one of the boxes of the corresponding box pair.

13. Apparatus for processing digital data values representative of a physical entity existing in three dimensions to produce a representation of an original data value set from a set of identifier pairs each including a buffer address and a procedure specification, the original data value set being represented in an array having three axes each with an upper limit, at least one of the identifier pairs representing a first predetermined pattern of digital data, the apparatus comprising:

a source buffer having a plurality of addressable areas specified by a buffer address for storing a second predetermined pattern of digital data values;

a target buffer having a plurality of addressable areas specified by a buffer address;

a processor for repeatedly determining, for each of the identifier pairs, a pattern of data values corresponding to each identifier pair by applying the procedure specified in that identifier pair to the portion of the source buffer indicated by the buffer address in that identifier pair; for storing the patterns of data into the addressable area of the target buffer indicated in the corresponding identifier pair; and for swapping data stored in the source and target buffers the target buffer being considered as the source buffer, until predetermined criteria are met; and an output device coupled to the memory and the processor for providing the contents of the target buffer as data values representative of the original data value set when the predetermined criteria are met;

the source and target buffers being arranged in an array having three axes, corresponding to the original data value set array axes, each source and target buffer array axis having an upper limit and at least one of the source and target buffer array axis upper limits differing from the corresponding original data value set array axis upper limit, whereby the representative data values constitute a representation of the original data value set at a resolution different than the original data value set.

* * * * *